(12) United States Patent
Ford et al.

(10) Patent No.: US 7,658,407 B2
(45) Date of Patent: Feb. 9, 2010

(54) AIR BAG WITH ACTIVE VENT

(75) Inventors: Brian C. Ford, Mt. Clemens, MI (US);
Thomas G. Busacca, Shelby Township, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 329 days.

(21) Appl. No.: 11/753,402

(22) Filed: May 24, 2007

(65) Prior Publication Data

US 2008/0018086 A1    Jan. 24, 2008

Related U.S. Application Data

(60) Provisional application No. 60/807,755, filed on Jul. 19, 2006.

(51) Int. Cl.
*B60R 21/276* (2006.01)

(52) U.S. Cl. .................................................. 280/739

(58) Field of Classification Search ............... 80/739; 802/739
See application file for complete search history.

(56) References Cited

U.S. PATENT DOCUMENTS

| 5,280,953 | A | 1/1994 | Wolanin et al. | |
|---|---|---|---|---|
| 6,648,371 | B2 * | 11/2003 | Vendely et al. | 280/739 |
| 6,659,499 | B2 * | 12/2003 | Jenkins | 280/735 |
| 6,773,030 | B2 * | 8/2004 | Fischer | 280/739 |
| 6,932,385 | B2 * | 8/2005 | Hawthorn et al. | 280/739 |
| 7,261,319 | B2 * | 8/2007 | DePottey et al. | 280/739 |
| 7,458,607 | B2 * | 12/2008 | Abe | 280/739 |
| 2004/0090054 | A1 * | 5/2004 | Bossecker et al. | 280/739 |
| 2007/0145729 | A1 * | 6/2007 | Ishiguro et al. | 280/739 |

FOREIGN PATENT DOCUMENTS

KR    10-2004-0041350 A    7/2004

* cited by examiner

*Primary Examiner*—Paul N Dickson
*Assistant Examiner*—Nicole Verley
(74) *Attorney, Agent, or Firm*—Markell Seitzman

(57) ABSTRACT

A safety system comprising an air bag configured to have at least one inflatable volume or chamber, an inlet through which inflation gas enters the inflatable volume, the air bag including at least one exit port or vent which when in an open state permits inflation gas to exit the volume or chamber, the exit port or vent located in a selected region of the air bag, a vent closure mechanism secured to the air bag and movable to close the exit port or vent by tension created in a tether which is part of the vent closure mechanism; as the air bag inflates, the tether has one end operatively secured to the air bag, a second end operatively secured to the vent closure mechanism, the tether including a medial portion slidably guided across a portion of the air bag.

9 Claims, 8 Drawing Sheets

AIR BAG WITH ACTIVE VENT

This application claims the benefit of U.S. Provisional Application 60/807,755, filed on Jul. 19, 2006. The disclosure of the above application is incorporated herein by reference.

BACKGROUND AND SUMMARY OF THE INVENTION

The present invention relates to an air bag having a closable vent. The present invention is applicable to all known types of air bags including: driver, passenger, curtain and seat-mounted side impact air bags and systems therefore.

Reference is briefly made to FIGS. 1 and 2, which show a conventional passenger-side air bag system 20. System 20 includes air bag 22 and an inflator 24. The air bag is configured to have an inlet 26 to receive inflation gas from inflator 24. The air bag is also configured to have one or more inflatable chambers 28. Inflator 24 is secured to a vehicle component such as a structural support member below the instrument panel. If air bag 24 is a driver side air bag, a curtain air bag, knee bag or a seat-mounted air bag, then the structural element is the steering wheel, roof rail, instrument panel support or seat.

FIGS. 1 and 2 further show the construction of a conventional passenger side air bag 22. Often air bags such as 22 utilize identical side panels 40 and 42 sewn to an elongated main panel 44. The above-mentioned inlet 26 is formed at the common region of each of the above panels 40, 42 and 44. Often, driver, passenger or other types of air bags include vents or exit ports such as 46 in each of the side panels 40 and 42. These vents 46 can be configured as openings in a panel or as high permeability areas in the panel. Typical of air bag construction is that each of the panels 40, 42 and 44 is made of woven nylon or polyester. These panels may be coated or uncoated and, as known in the art, the permeability of uncoated panels can be controlled utilizing various weaving techniques.

The purpose of a vent is to provide a path such that inflation gas can exit the air bag. It has been found desirable to keep the vent open while the fully inflated shape of the air bag has not been achieved and to close the vent when the air bag is fully inflated. In certain situations, the occupant to be protected is not sitting properly in his or her seat; generally, the occupant is said to be sitting in an "out-of-position" (OOP) position or orientation. One such out-of-position orientation is with the occupant bent forwardly toward the location of the non-inflated air bag. In this situation, the occupant's body will impact the inflating air bag prior to the air bag becoming fully inflated. It has been shown desirable to slow the inflation of the air bag, in the condition recited above, by permitting the vents to stay open, allowing inflation gas to leave the air bag, which among other things lessens the impact velocity of the bag with the occupant.

It is an object of the present invention to provide an air bag having a vent closure mechanism that closes associated air bag vents as the air bag becomes fully inflated.

Accordingly the invention comprises: a safety system comprising an air bag configured to have at least one inflatable volume or chamber, an inlet through which inflation gas enters the inflatable volume, the air bag including at least one exit port or vent which, when in an open state, permits inflation gas to exit the volume or chamber, the exit port or vent located in a selected region of the air bag, a vent closure mechanism secured to the air bag and movable to close the exit port or vent by tension created in a tether, which is part of the vent closure mechanism; as the air bag inflates, the tether has one end operatively secured to the air bag, a second end operatively secured to the vent closure mechanism, the tether including a medial portion slidably guided across a portion of the air bag.

Many other objects and purposes of the invention will be clear from the following detailed description of the drawings.

DETAILED DESCRIPTION OF THE DRAWINGS

Figure 1:
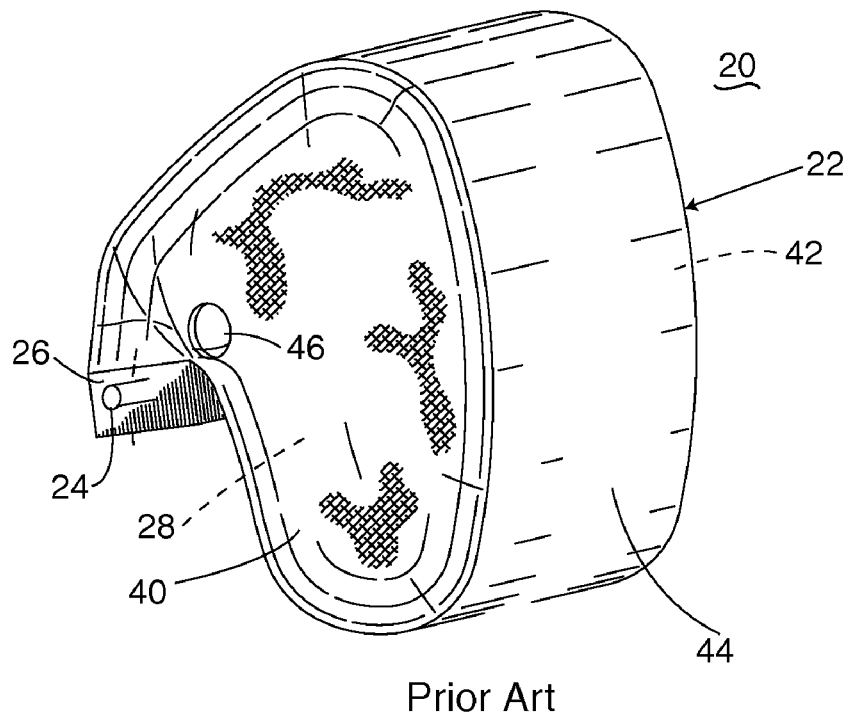
FIGS. 1 and 2 illustrate a prior art passenger side air bag.
Figure 2:
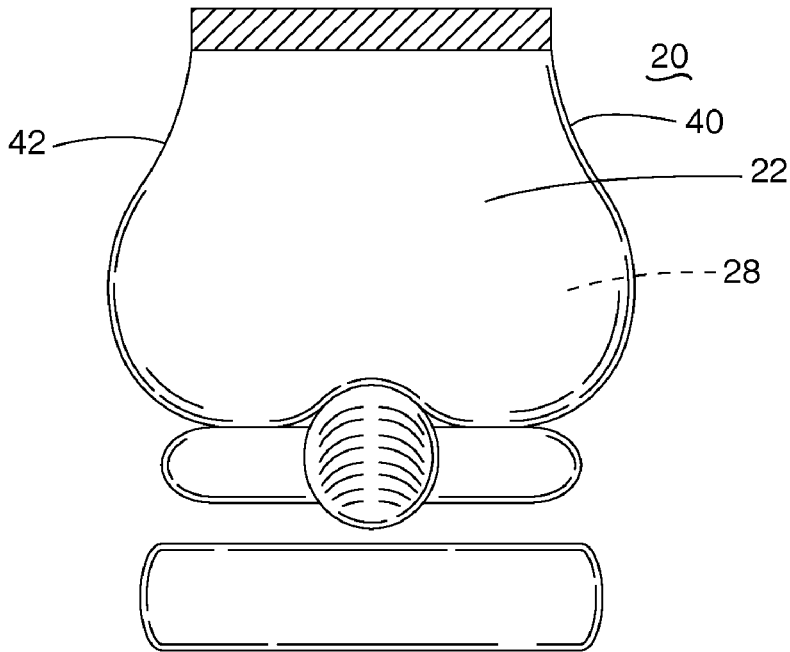
Figure 3:
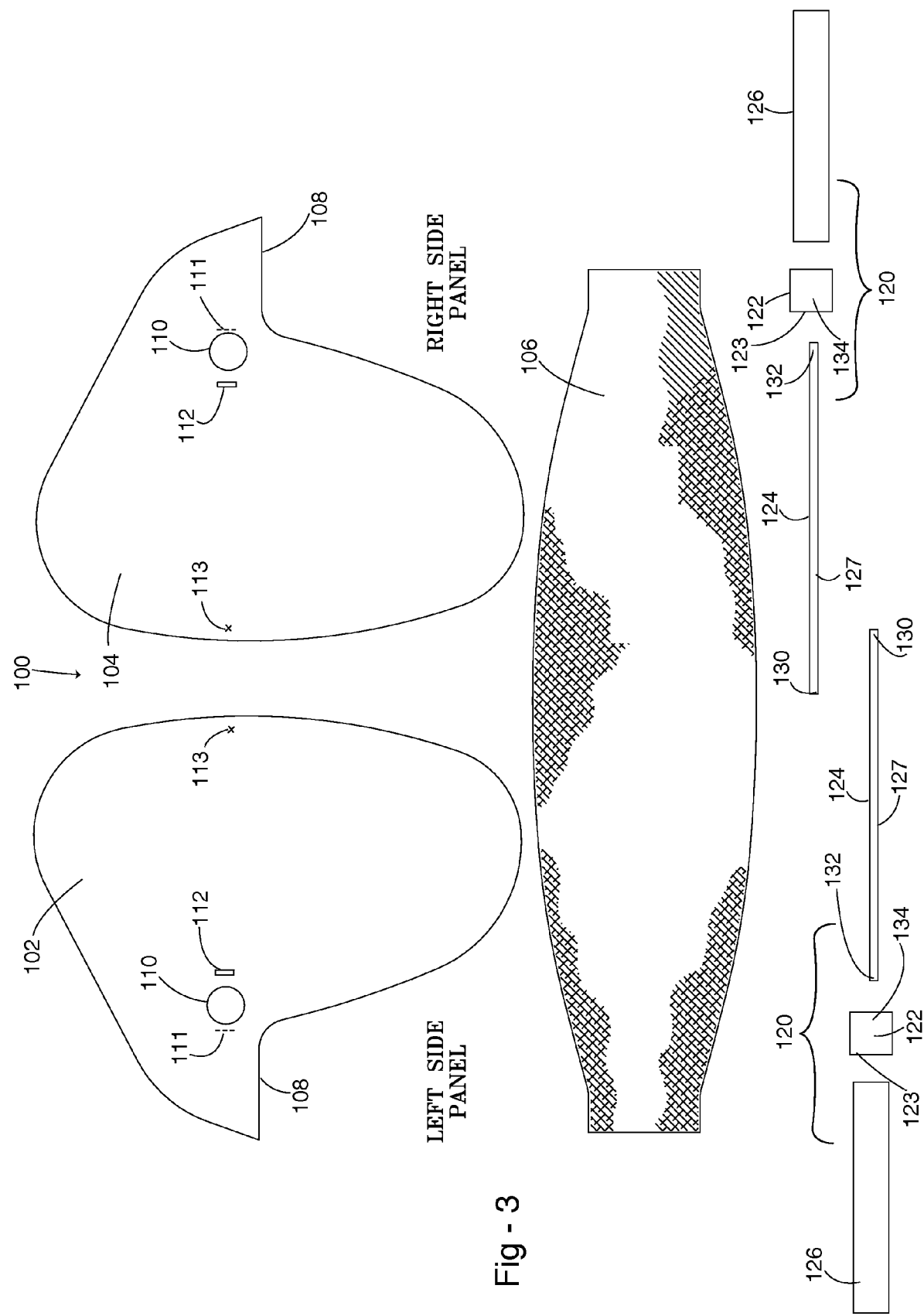
FIG. 3 illustrates the various parts of an air bag constructed using the present invention.

FIG. 3 illustrates the basic components of a passenger side air bag 100 that incorporates the present invention. Air bag 100 includes side panels 102 and 104 that are substantially the same as those used in conventional air bags. Further, air bag 100 includes a main panel 106 that is secured to the side panels 102 and 104 to form the inlet 108 (see FIG. 4b) and an inflatable internal volume or chamber 107, also shown in FIG. 4b. An exemplary inflator 109 is positioned within inlet 108. Each side panel 102 and 104 includes a vent or opening 110 (one or more can be used). The air bag 100 additionally includes a vent closing mechanism 120, one associated with each vent 110, comprising a movable flap 122 and a flexible tether 124, which assists in moving the flap to a position in which an associated vent 110 is closed. Mechanism 120 further includes a flexible elongated panel 126, typically rectangular, which is secured to each side panel 102 and 104 to provide a flexible tubular channel for the tether 124 and to guide the tether across a region or path along a surface of the side panel. Each air bag additionally includes an opening or slit 112 located proximate each vent 110. In general, the number of vent closing mechanisms 120 used equals of the number of vents that need to be closed during the operation of the airbag 100.

Reference is again made to side panels 102 and 104 of FIG. 3. Each of the side panels illustrates a dotted line 111 and an 'X' or location 113. The dotted line 111 identifies the seam that secures one side 123 of flap 122 to either panel 102 or 104. Similarly 'X' or location 113 identifies the location where end 130 of tether 124 is secured to each side panel 102 or 104. End 132 of tether 124 is secured to flap 122 at a location identified by numeral 134, generally opposite the side of the flap secured to the side panel.

Figure 4A:
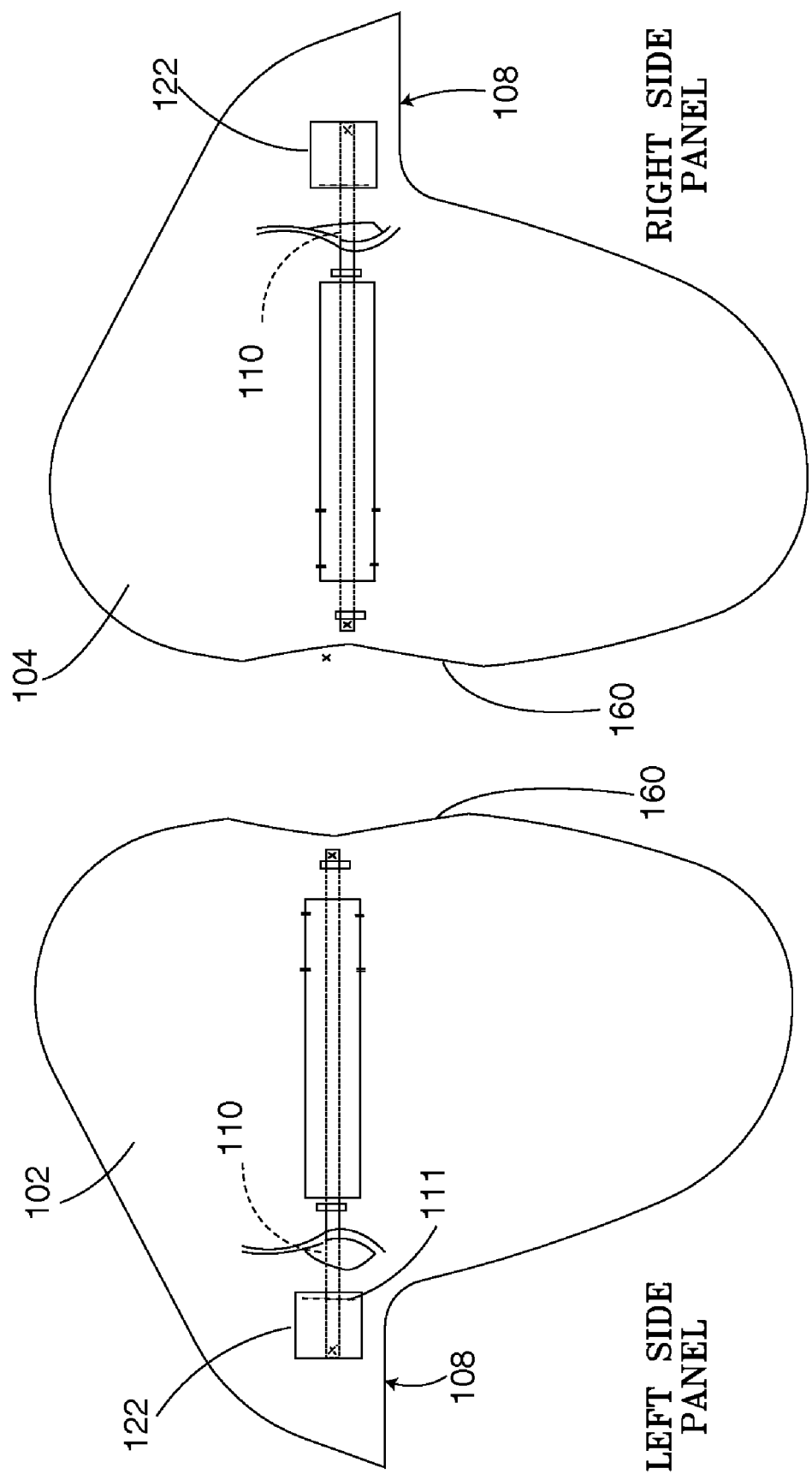
FIG. 4a illustrates two side panels of the present invention with a vent closing mechanism in an opened position.
Figure 4B:
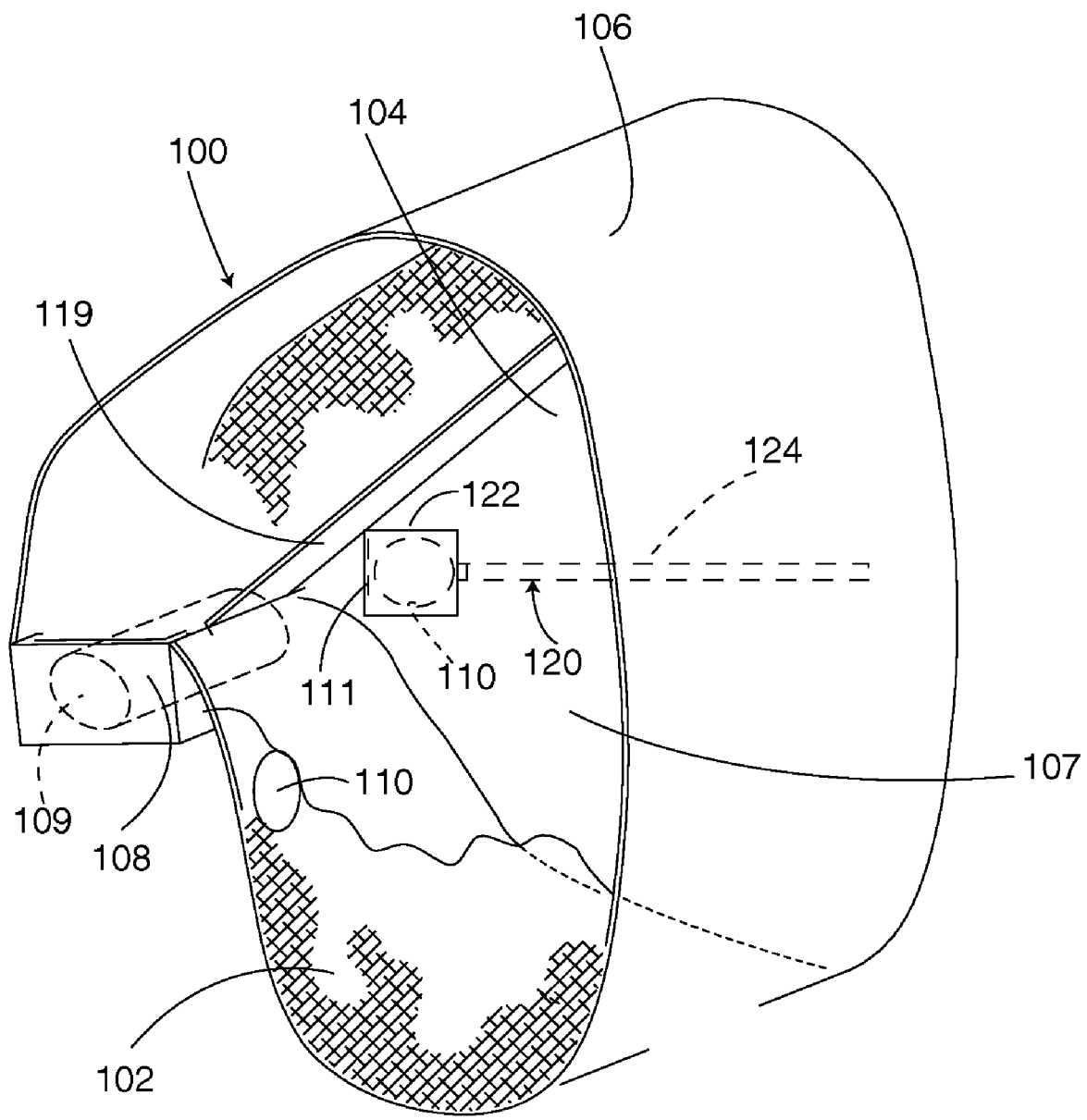
FIG. 4b is an isometric view of the present invention with a portion of one of the side panels removed for the purpose of illustration.

Reference is briefly made to FIG. 4b, which illustrates a fully inflated air bag 100. A portion of side panel 102 has been removed so the interior of chamber 107 is more easily seen. One of the vent closing mechanisms 120 can be seen closing an associated vent 110. In this condition tether 124 is drawn taut, as the air bag approaches a fully inflated state, and has pulled, moved or rotated flap 122 from the flap's initial position away from the vent to cover the previously open vent 110 (see arrows 131 of FIG. 4d that indicate the movement of vent 110). FIG. 4b also illustrates the use of an additional, internal tether 119 that connects the top of main panel 106 to the material forming inlet 108. This technique is useful in controlling the inflated shape of the upper portion of the air bag.

Figure 4C:
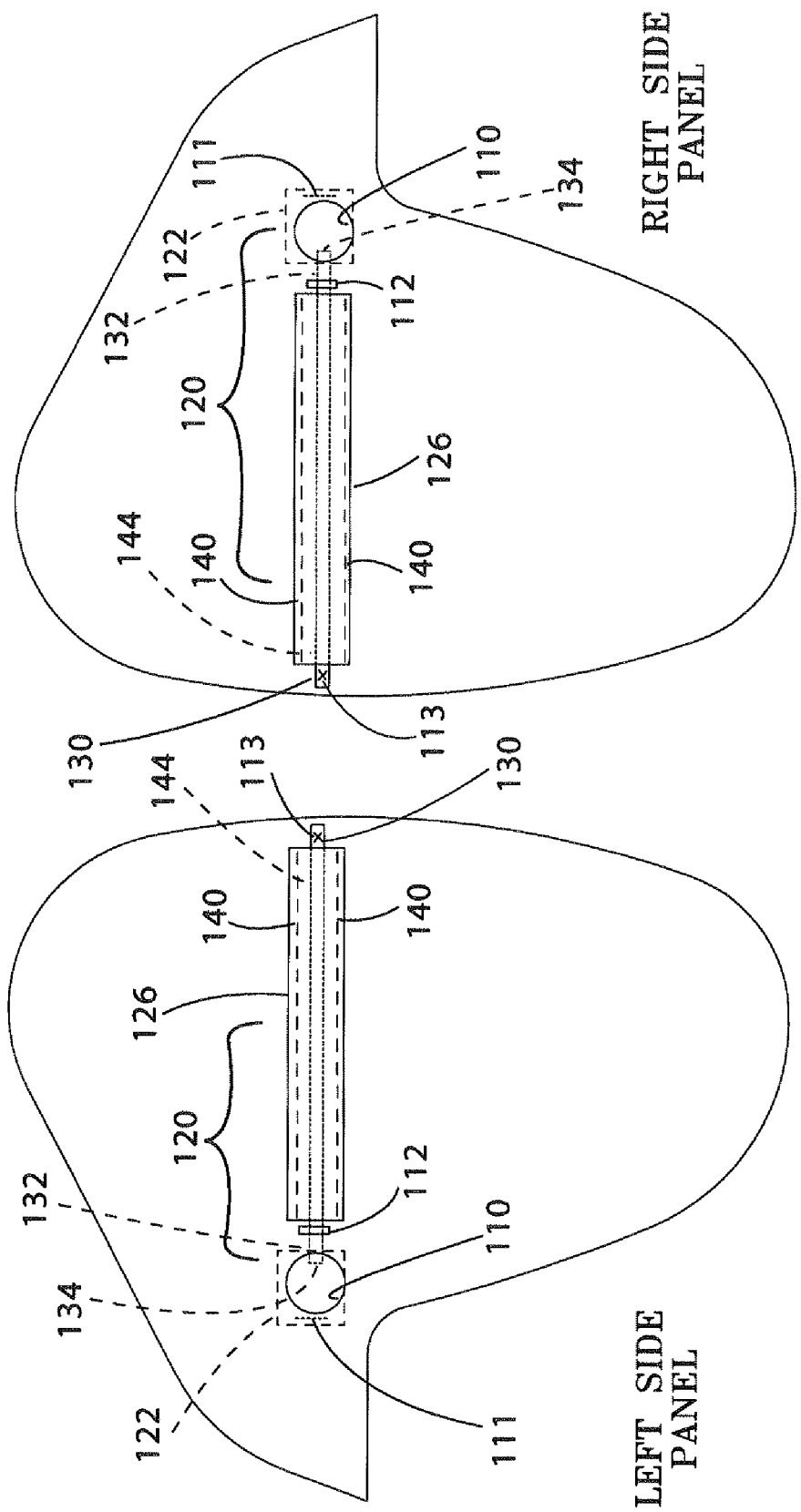
FIG. 4c illustrates two opposing side panels with a vent closing mechanism in a closed position covering an associated vent or opening in the air bag side panel.

As previously mentioned each vent closing mechanism 120 includes the flap, tether and a rectangular panel 126. Reference is made to FIG. 4c, which illustrates the construction of a typical vent closing mechanism 120. Each of flaps 122 is sewn along the seam 111 to any interior surface of the side panel 102 or 104. When air bag 100 is in its folded condition the flap is manipulated so that it is rotated away from vent 110. Panel 126 is sewn to an exterior surface of a side panel in a manner as shown in FIG. 4c. Numeral 140 illustrates the seam or seams by which each panel 126 is secured to a side panel. As can be appreciated, the seams 140 can be replaced by a plastic weld or adhesive. The center of each panel 126 not secured to the side panel creates a flexible tube or passage 144. Tether 124 is threaded through this passage and is secured at position 113 to the side panel. End 132 of tether 124 is threaded within a narrow opening 112 so that end 132 is adjacent an interior surface of side panel 102 or 104, as the case may be. Thereafter end 132 is secured at location 134 of the previously secured flap 126.

Figure 4D:
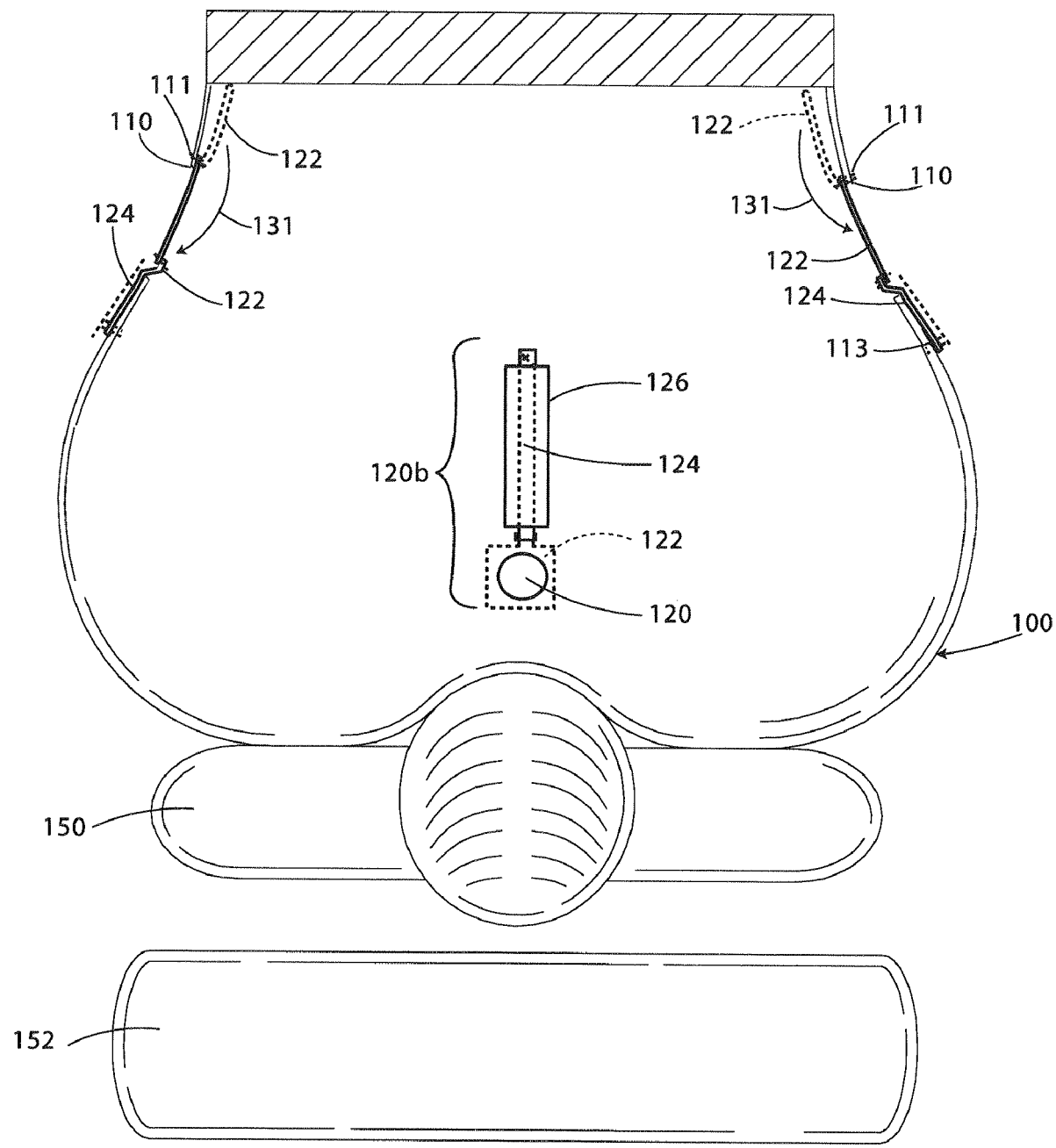
FIG. 4d shows an inflated air bag protecting an occupant with vent closure mechanisms closing vents.

Reference is made to FIG. 4d, which diagrammatically illustrates an occupant 150 seated upon a seat 152. This figure also shows air bag 100 in the fully inflated condition. Each flap 122 has been pulled by its corresponding tether 124 into a position closing its associated vent 110. Additionally, each flap 122 is shown by phantom line folded or rotated away from vent 110, which as mentioned is the orientation assumed by each flap 122 in the folded air bag. Reference is briefly made to FIG. 4a, which illustrates the two side panels 102 and 104 in a condition illustrative of a partially inflated air bag 100. In this condition each flap 122 is still rotated away from the vent 110 it will close. Each vent 110 is shown in a partially opened condition to show this transitory state of the air bag. Additionally, the front portions 160 of each panel 102 and 104 are shown indented to also illustrate that the air bag has not been inflated and also to illustrate that each tether 124 has not yet become tensioned, as illustrated in FIG. 4d. Further, FIG. 4d shows another variant of the invention. The vents can be located on any surface of the air bag including the top and/or bottom. Here a vent closing mechanism 120b is used to close a vent 110 located on the top of the air bag. The construction of mechanism 120b is the same as the mechanism disclosed above.

Figure 5:
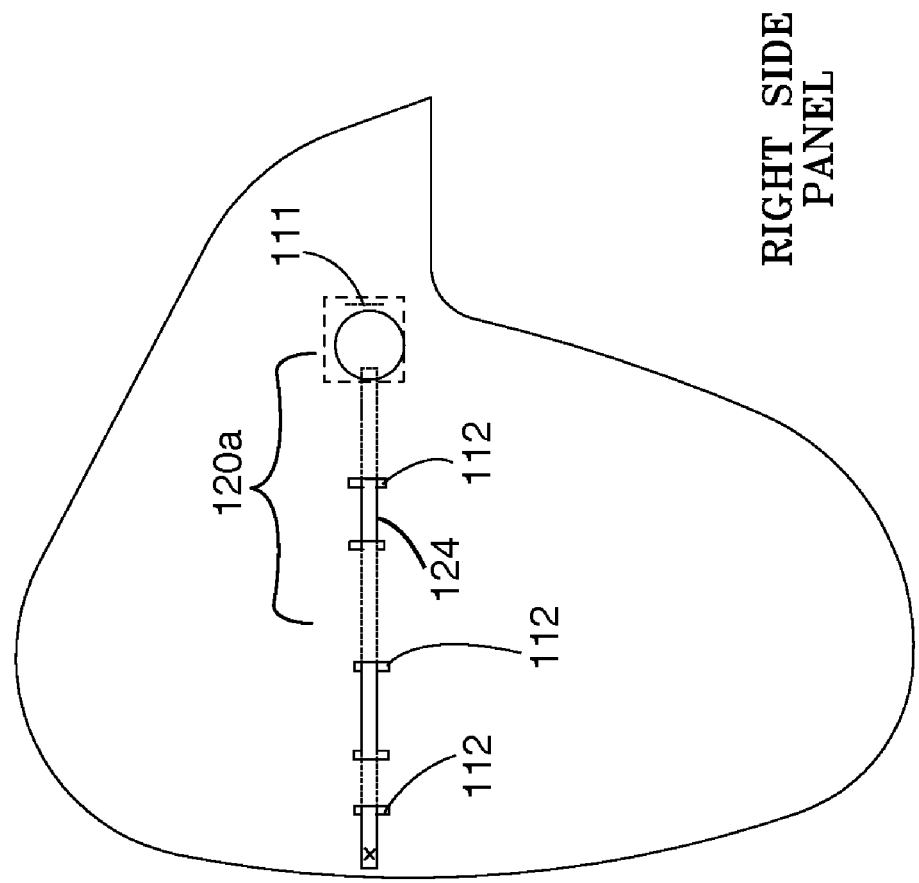
FIG. 5 illustrates an alternate embodiment of the invention.

Reference is made to FIG. 5, which illustrates an alternate embodiment of the invention. In this embodiment panel 126 has been removed from the vent closure mechanism now shown by numeral 120a. Panel 126 functions to provide a guide for tether 124 so that the medial portion 127 of the tether lies along a specified region of a surface of a side panel as was illustrated in FIG. 3. As previously illustrated, panel 126 was secured to the outer surface of the side panel, however panel 126 could alternatively have been secured to an interior surface of the side panel in which case the tether would have been slideably adjacent this inside surface. In the embodiment shown in FIG. 5 each side panel includes a plurality of openings 112; each tether 124 is woven through these openings 112. These openings 112, as did panel 126, locate the tether along a specified region, path or trajectory on a side panel. As before, one end 130 of the tether 124 is secured to the side panel while the other end is secured to the flap 122.

Figure 5A:
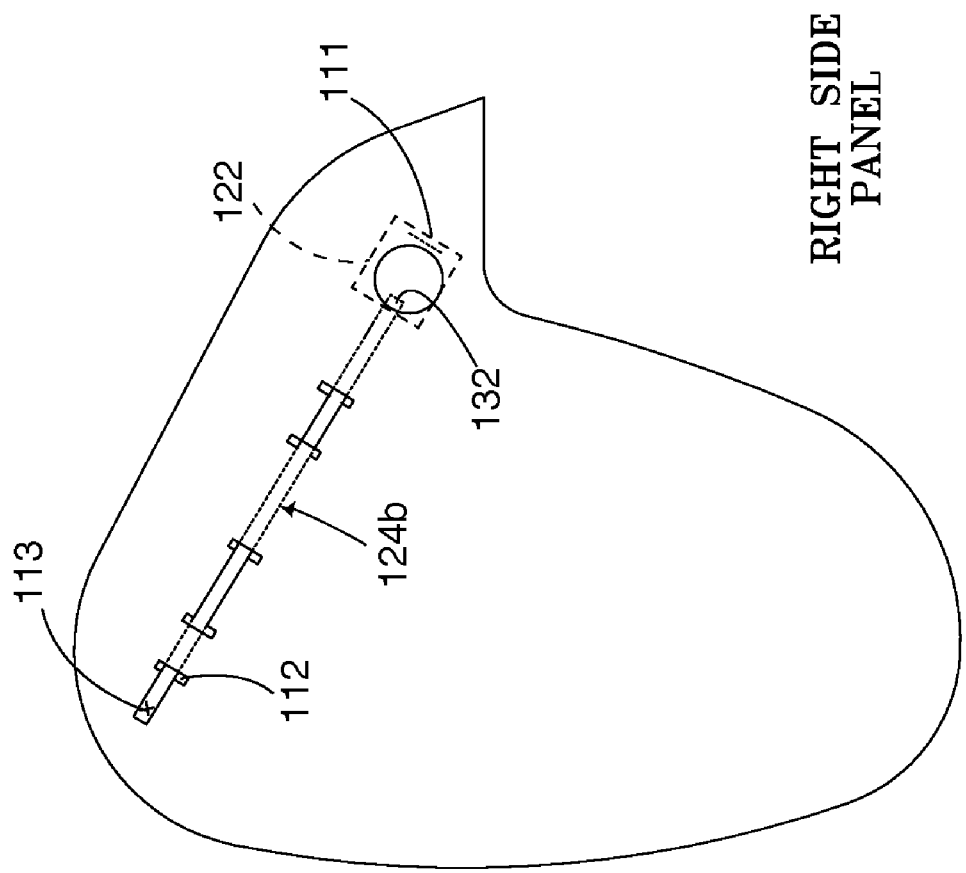
FIG. 5a illustrates another alternate embodiment of the invention.

As can be appreciated tether 124 need not move horizontally across a side panel. This is illustrated diagrammatically in FIG. 5a in which exemplary obliquely positioned tethers are shown. In one instance one tether 124a extends toward the lower extreme of the side panel. In this configuration the tether 124a, the flap, seams 111 and loops 112 are all rotated by the same angle from the positions shown in FIG. 5. FIG. 5a also shows a second obliquely positioned tether 124b, as in another embodiment, rotated toward the upper portion of the side panel.

Many changes and modifications in the above-described embodiment of the invention can, of course, be carried out without departing from the scope thereof. Accordingly, that scope is intended to be limited only by the scope of the appended claims.

The invention claimed is:

1. A safety system comprising an air bag configured to have at least one inflatable volume or chamber, an inlet through which inflation gas enters the inflatable volume, the air bag including at least one exit port or vent which when in an open state permits inflation gas to exit the volume or chamber, the exit port or vent located in a selected region of the air bag, a vent closure mechanism which has a movable flap located inside the chamber and secured to an internal surface or panel of the air bag and movable to close the exit port or vent by tension created in a tether which is part of the vent closure mechanism; as the air bag inflates, the tether has one end operatively secured to an external surface or panel of the air bag, the tether which passes through a slit or opening internally onto the chamber near or proximate to the exit port or vent and extending across the exit port or vent to a second end operatively secured to the flap vent closure mechanism, the tether including a medial portion slidably guided across the surface or panel of the air bag.

2. The system according to claim 1 wherein the vent closure mechanism moves from a first position in which the vent is open to a second position in which the vent is fully or partially closed.

3. The system according to claim 2 wherein the movable flap is a door hinged on an inside surface of the air bag and rotatable to close the vent or slidably secured to the inner surface of the air bag and slidably movable to close the vent.

4. The system according to claim 3 wherein the hinge is configured to be rotatable and thereby close the vent or the vent closure mechanism is laterally movable across the vent to a closed position.

5. The system according to claim 1 wherein the one end of the tether is fixably secured to the surface of the air bag, the medial portion of the tether held in close proximity to an adjacent portion of the air bag and permitted to slide relative to this adjacent portion of the air bag.

6. The system according to claim 5 including a sleeve on the outer surface of the air bag through which the tether is positioned relative to the outer surface and slidingly held thereto.

7. The system according to claim 6 wherein the tether is flexible.

8. The system according to claim 7 wherein the flexibility of the tether is substantially the same as that of the region of the air bag to which it is attached.

9. The system according to claim 6 wherein the flap is flexible.

* * * * *